Oct. 16, 1934.  I. A. WEAVER  1,977,297

WHEEL TESTING APPLIANCE

Filed April 7, 1934  2 Sheets-Sheet 1

Inventor:
Ira A. Weaver,
By Walter M. Fuller
Atty

Oct. 16, 1934.                I. A. WEAVER                1,977,297
                        WHEEL TESTING APPLIANCE
                          Filed April 7, 1934              2 Sheets-Sheet 2

Inventor:
Ira A. Weaver,
By Walter M. Fuller
                Atty.

Patented Oct. 16, 1934

1,977,297

UNITED STATES PATENT OFFICE 1,977,297

WHEEL-TESTING APPLIANCE

Ira A. Weaver, Springfield, Ill., assignor to Weaver Manufacturing Company, Springfield, Ill., a corporation of Illinois Application April 7, 1934, Serial No. 719,433

4 Claims. (Cl. 33—203)

The instant invention relates to appliances for facilitating the balancing of automobile wheels and for checking the degree of trueness with which they revolve about their axes.

One leading object and prime purpose of the invention is to provide an apparatus of this character which is shiftable to render the application of the wheel thereto a matter of ease and convenience, whereupon the wheel and its mounting may be rocked to vertical position for its testing as to balance and accuracy and precision in its revolution in its proper plane.

A further aim of the invention is to supply an appliance of this type or character which is simple in structure, which can be produced at relatively small cost, which is easily operable, which is reliable in its action, and which is unlikely to become damaged or injured in ordinary service, even though used by relatively inexperienced persons.

To enable those skilled and trained in this art to understand the invention and the advantages which accrue from its employment, in the accompanying drawings, to which reference should be had in connection with the following detailed description, present preferred embodiments of the invention have been illustrated, and for simplicity like reference numerals have been employed to designate the same parts throughout the several views.

In these drawings:—

Figure 1:
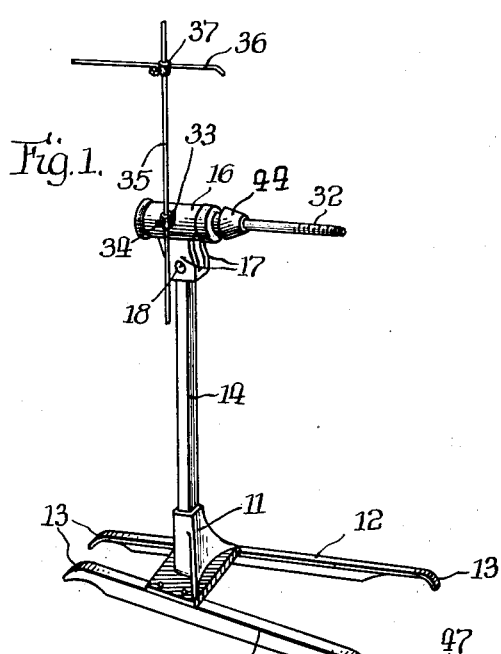
Figure 1 is a perspective view of the novel and improved structure.
Figure 3:
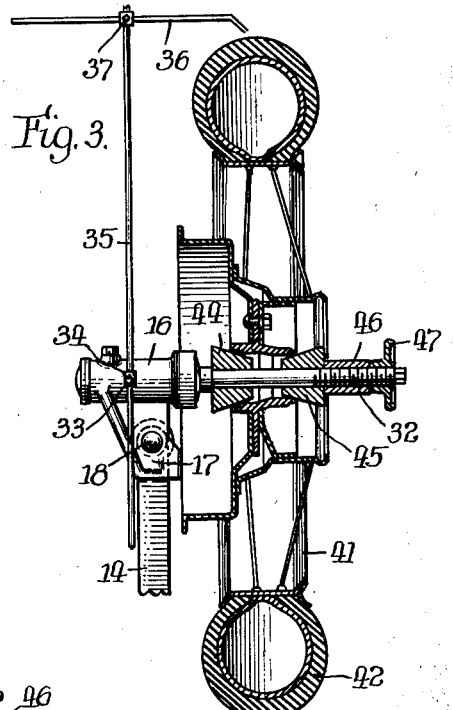
Figure 3 shows the same parts as presented in Figure 2, with the wheel and its mounting rocked to vertical testing position.

Referring to these drawings, it will be noted that the balancing and testing apparatus comprises a base casting 11 supported on and attached to a pair of diverging, elongated feet 12, 12 which may conveniently be angle-bars with downwardly-bent ends 13, 13 from which one of the flanges has been cut away, so that in effect, such feet provide practically a three-point support on the floor for the structure.

An upright or erect standard 14, square in cross-section in the present instance, at its lower end is appropriately mounted in member 11, its upper, enlarged end 15 being accommodated in a hollow bracket, characterized as a whole 16 and comprising a pair of spaced or separated side-walls 17, 17 between which the head 15 is received, these side-walls being hinged to, or rockingly mounted on, such head on a hinge-pin 18, allowing the bracket to be rocked in a vertical plane, as will be readily understood.

Figure 4:
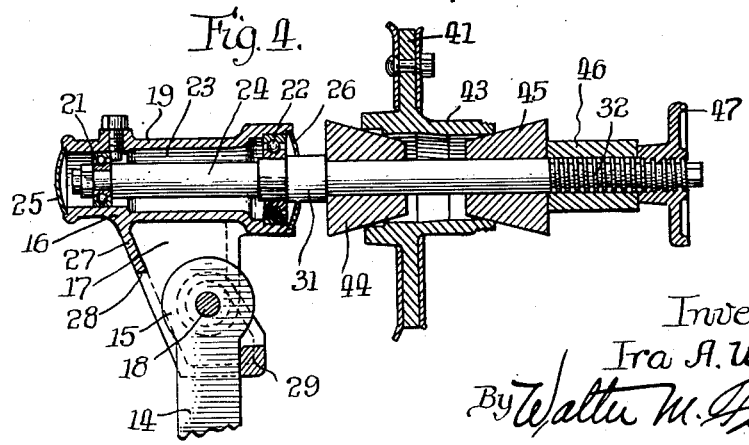
Figure 4 is a central section through the upper portion of the apparatus showing a part only of the wheel mounted thereon.

As is clearly presented in Figure 4, such bracket has a hollow portion 19 internally accommodating a pair of ball-bearings 21, 22 in its chamber 23, such bearings affording antifriction means for supporting a revoluble shaft 24 which extends outwardly a considerable distance beyond one end of the member 19.

As is customary in analogous structures, such bearings and shaft have the usual shoulders and nut or equivalent means for properly mounting the shaft in the bracket, one end of chamber 23 being closed by a disc 25 and the other or opposite end being fitted with an apertured disc 26 through the central opening of which the shaft extends, these discs or end closures being provided to retain a suitable light lubricant in the chamber, whereby the shaft is free to turn on its axis with a minimum of friction.

Figure 2:
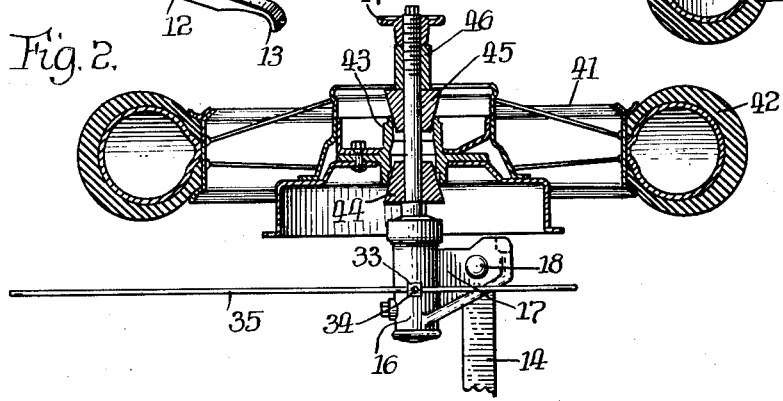
Figure 2 is a fragmentary view illustrating the manner of applying a vehicle-wheel thereto.

The specified bracket is adapted to be swung about the axis of its hinge-pin 18 to position the shaft 24 vertically, as shown in Figure 2, in order to lighten the labor or to free from difficulty the application of the wheel to be tested on the shaft, or to be rocked into horizontal position after the mounting of the wheel thereon, for the performance or carrying out of the balancing or testing operation.

Figure 8:
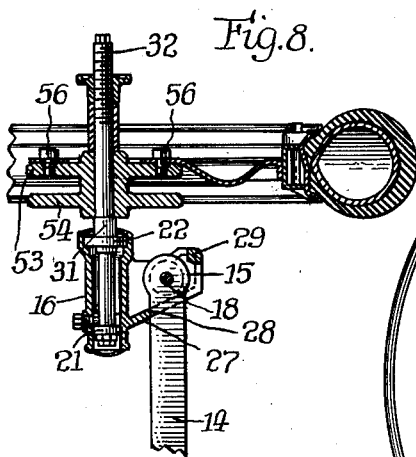
Figure 8 is a fragmentary view indicating the manner in which a disc wheel may be mounted on the balancing stand.
Figure 5:
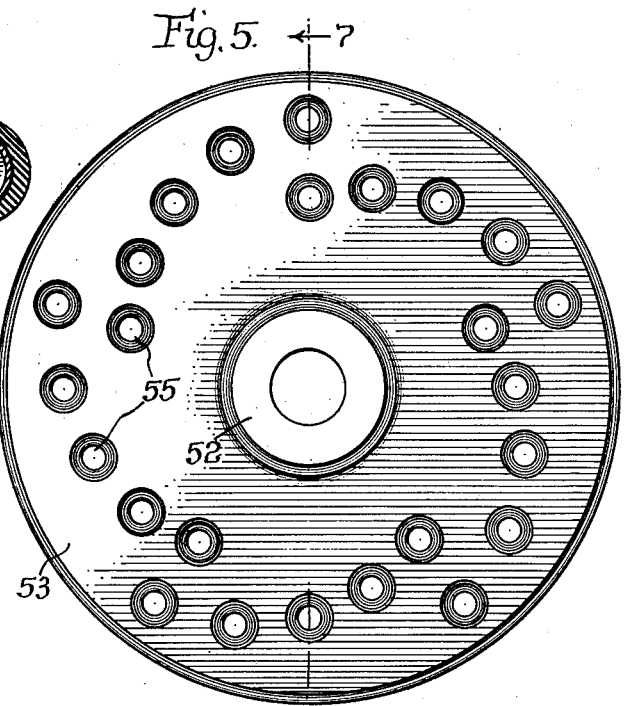
Figure 5 is one face view and Figure 6 is an opposite face view of an apertured member which may be employed on the balancing stand for the attachment of disc wheels of different types for testing purposes.
Figure 7:
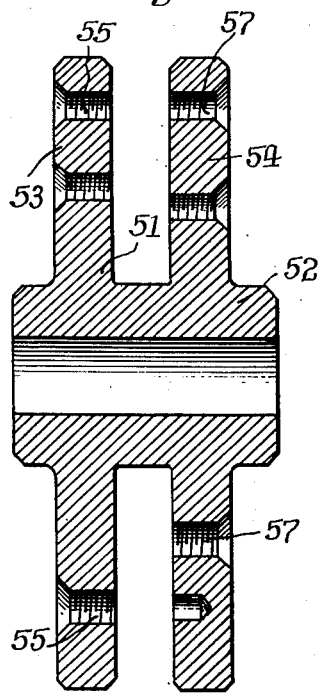
Figure 7 is a cross-section on line 7—7 of Figure 5.
Figure 6:
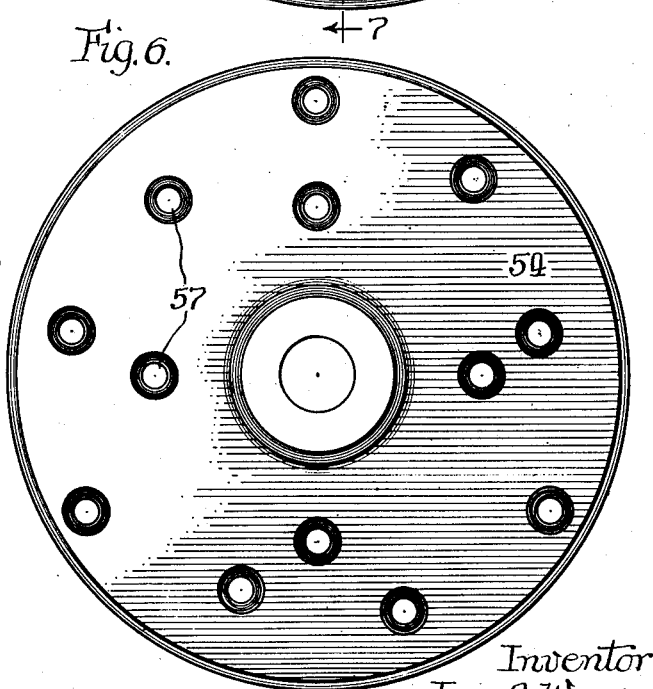

An inclined wall 27 connects the spaced side-walls of the bracket together and its edge 28 is accurately and correctly located on the bracket, so that when it bears on the side of the post or standard 14, as indicated in Figure 8, the shaft 24 will be exactly vertical and another cross-wall 29 joins the side-walls together and it is so positioned that when it bears on the opposite side of the standard, as illustrated in Figure 4, the shaft or spindle will be precisely horizontal.

As is fully portrayed in the several views of the drawings, the protruding or outwardly extended portion of the shaft comparatively near the bracket has a circular shoulder 31 and the extreme outer end of the shaft is screw-threaded at 32.

An apertured boss 33 outstanding from the side of the part 19 of the bracket and equipped with a set-screw 34 slidingly and adjustably receives a rod 35 on which a pointer 36 is movably mounted in a block 37 slidable on the rod 35 and in which member 37 the pointer is longitudinally shiftable or adjustable in the usual and customary manner, so that the end of the pointer may be positioned as desired.

Because of its weight, shape and size, it is more or less difficult and cumbersome to mount an automobile wheel accurately on a horizontal spindle, and, accordingly, the shaft or spindle of this device is so carried on the upright standard or post that it may be easily rocked or turned into vertical position for the ready application of the wheel thereto.

Therefore, when the wheel is to be tested the following procedure applies.

Assuming that the wheel 41 and its tire 42 to undergo the test, including its hub 43, have been removed from the vehicle, the spindle of the apparatus is brought to upright position, which of course is determined and maintained by the part 28 bearing on the corresponding side of the standard.

Thereupon the operator applies a cone 44 on the shaft so that it rests on the now-horizontal shoulder 31 thereof, and then he mounts the wheel on the spindle with its hub bearing on such centering cone.

This result having been accomplished, a second companion or correlated cone 45 is placed on the shaft and it fits in the upper end of the wheel-hub, whereupon a sleeve or spacer 46, if required, is applied to the shaft above the upper cone, and then a hand-operated nut or screw-threaded hand-wheel 47 is screwed on the upper, threaded portion of the shaft until all of the parts are properly centered and bound together fixedly on and to the shaft.

Following this, the operator rocks the wheel, spindle and bracket down into its other position with the spindle horizontal and with the wheel in a true vertical plane, such exact and precise position of the parts being determined by the engagement of the wall 29 with the other side of the standard.

Then the operator permits the wheel and spindle to turn to allow the heavy side to reach the bottom.

By successive balancing tests and the application of a weight or weights to the correct points of the wheel an accurate balance may be attained with ease and facility.

Owing to the fact that the axis of the spindle, when in its upright position, is well to one side of the axis of the hinge-pin of the bracket, the bracket and spindle maintain the specified position without danger of accidental dislodgement or shifting of the parts during the mounting of the wheel on the shaft, and similarly, when the parts are rocked to the operative position wherein the wheel is in a vertical plane, there is complete assurance that the wheel is definitely and without question in an exact vertical plane and without danger of unintentional deviation therefrom, due, as will be easily appreciated, to the fact that the center of gravity of the rockable assembly is well to one side of the hinge-pin axis.

All of this may be readily accomplished with assurance and without the locking or unlocking of any of the parts forming the tiltable assembly.

In some cases, the wheel, such as a disc wheel, cannot be centered on the shaft or spindle by means of the pair of companion cones and for the accomodation of such wheels a modified construction is used in place of the tapered cones, such novel supplemental structure being presented in Figures 5 to 8, inclusive.

This comprises a single member, designated as a whole 51, involving a central hub 52 adapted to fit on the shaft and having a pair of parallel, apertured discs or round plate members 53 and 54 spaced apart an appropriate distance.

To receive disc wheels of different sizes, the plate element 53 has five curved rows or series of screw-threaded holes 55, forming five groups of six holes each, the holes of each group being at different distances from the axis of the hub, with the corresponding holes of the several groups at the same distance from the center.

Such part of the structure is therefore adapted to have disc wheels of any one of five sizes mounted thereon, as shown in Figure 8, by means of suitable screws 56 extending through the apertures of the disc wheel and fitting in the corresponding holes of the supporting member 51.

As is clearly portrayed, member 51 is designed to be placed on the shaft 24 up against its shoulder 31, the wheel is fastened thereon while the shaft is vertically disposed and the spacer 46 and hand-wheel nut are applied, so that the supporting member and its wheel are clamped rigid with the shaft.

Then the rockable bracket and its wheel are swung over to bring the wheel into a true vertical plane and its testing may then be proceeded with.

In neither instance, whether the cones are used or the apertured support employed, to demount the wheel, it is preferably rocked back to horizontal position, then released, and lifted off.

The holes in some wheels may not be capable of being brought into register with the threaded apertures of the part 53 of the supporting member 51, and for this reason the second disc or plate section 54 is provided thereon with other threaded holes 57 differently spaced or different in number to cooperate with the apertures of such wheels, but most standard wheels can be mounted on the part 53.

After the wheel has been mounted on the shaft in any of the ways referred to, it or its tire may be tested as to trueness of rotation either while the wheel is in horizontal or vertical position by adjusting the gauge 35, 36 to bring its end close to the tire, rim, or wheel, and observing the extent or degree of deviation of the adjacent rotating parts from the fixed or stationary end or finger of the adjustable gauge, all as will be readily understood by one acquainted with this art.

Inasmuch as the gauge referred to is mounted on the hinged bracket, it swings with the latter and is always in convenient place for use with the wheel in either of its two positions.

The new invention has been presented in the appended claims, but it is to be remembered that it is susceptible of a variety of embodiments in satisfactory operative form and that it is not limited and restricted to the precise and exact details of structure herein described and illustrated and that more or less minor or major modifications may be resorted to without departure from the heart and essence of the invention and without the loss or sacrifice of any of its substantial advantages.

I claim:

1. In a vehicle-wheel testing-appliance, the combination of an upright standard, a bracket hinged to the upper portion of said standard to swing about a substantially horizontal axis, a shaft revolubly mounted in and propecting from said bracket, and means to support and to center a vehicle-wheel on said shaft at one side of its hinge, whereby said bracket may be turned on its hinge to position said shaft substantially vertically for the reception of the wheel and may be swung on its hinge to shift the wheel mounted on the shaft to vertical testing position.

2. The structure presented in claim 1 in which coacting abutment means on said bracket and standard automatically limit the swinging of the bracket on its hinge in opposite directions to position its shaft horizontally or vertically.

3. The structure presented in claim 1 in combination with an adjustable gauge mounted on said bracket and adapted to coact with the wheel carried on the shaft, and in which coacting abutment means on said bracket and standard automatically limit the swinging of the bracket on its hinge in opposite directions to position its shaft horizontally or vertically.

4. In a vehicle-wheel testing appliance, the combination of an upright standard, a bracket hinged to the upper portion of said standard to swing about a substantially horizontal axis, a shaft revolubly mounted in and projecting from said bracket, a disc member having a plurality of groups of threaded holes at different distances from its center adapted to be mounted on said shaft, means to fasten a vehicle-wheel to said disc member and extending through apertures of the wheel and engaging the threaded holes of said member, and means to bind said disc member on said shaft whereby the mounted wheel is rigid with respect to the shaft, said shaft being located at one side of the bracket hinge, whereby said bracket may be turned on its hinge to position said shaft substantially vertically for the reception of the wheel on said member and may be swung on its hinge to shift the wheel on said member to vertical testing position.

IRA A. WEAVER.